US008413694B2

(12) United States Patent
Williams et al.

(10) Patent No.: US 8,413,694 B2
(45) Date of Patent: Apr. 9, 2013

(54) PORTABLE FLUID TREATING AND DISPENSING DEVICE, SYSTEMS, ARTICLES, AND METHODS

(75) Inventors: Benjamin P. Williams, St. Joseph, WI (US); Kevin Kinzer, Forest Lake, MN (US); Judd D. Olson, Deephaven, MN (US); Robert J. Reuter, Woodbury, MN (US); Sean C. McGreevy, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1083 days.

(21) Appl. No.: 12/136,220

(22) Filed: Jun. 10, 2008

(65) Prior Publication Data
US 2009/0301604 A1 Dec. 10, 2009

(51) Int. Cl.
*B65B 37/00* (2006.01)
(52) U.S. Cl.
USPC ............ 141/237; 141/18; 141/236; 141/247; 141/286; 141/335; 210/513; 222/189.06
(58) Field of Classification Search ............... 141/18, 141/234, 236, 237, 239, 247, 286, 297, 298, 141/309, 331, 333, 335, 338, 344, 345, 349, 141/365; 210/513, 510; 222/190, 189.06
See application file for complete search history.

(56) References Cited

U.S. PATENT DOCUMENTS

| 3,561,506 A | * | 2/1971 | Johnson | 141/360 |
| 3,794,088 A | | 2/1974 | Harvey | |
| 4,735,716 A | | 4/1988 | Petrucci et al. | |
| 4,969,996 A | | 11/1990 | Hankammer | |
| 5,049,270 A | | 9/1991 | Carrano et al. | |
| 5,107,909 A | * | 4/1992 | Donovan | 141/296 |
| D344,872 S | | 3/1994 | Velez | |
| 5,447,110 A | * | 9/1995 | Brown | 141/2 |
| 5,569,374 A | | 10/1996 | Williams | |
| 5,921,296 A | * | 7/1999 | Porter et al. | 141/340 |
| 6,085,806 A | * | 7/2000 | Davis et al. | 141/98 |
| 6,290,848 B1 | | 9/2001 | Tanner et al. | |
| 6,841,067 B1 | | 1/2005 | Hofmann et al. | |
| 7,308,919 B1 | * | 12/2007 | Zavala | 141/247 |
| 2003/0159755 A1 | * | 8/2003 | Wessberg | 141/301 |
| 2006/0226064 A1 | | 10/2006 | Beckman et al. | |

FOREIGN PATENT DOCUMENTS

JP 61-127490 7/1986
WO WO 2006-134616 12/2006

OTHER PUBLICATIONS

International Search Report for PCT/US2009/046105 prepared by the Korean Intellectual Property Office, mailed Jan. 8, 2010, 3 pages.

* cited by examiner

*Primary Examiner* — Gregory Huson
*Assistant Examiner* — Jason K Niesz
(74) *Attorney, Agent, or Firm* — David B. Patchett

(57) ABSTRACT

Disclosed are portable fluid treating and dispensing devices, systems, articles, and methods particularly adapted for use in treating potable liquids, such as drinking water, and dispensing it into a plurality of portable potable liquid containers, such as water bottles.

15 Claims, 9 Drawing Sheets

PORTABLE FLUID TREATING AND DISPENSING DEVICE, SYSTEMS, ARTICLES, AND METHODS

BACKGROUND

The present description is directed generally to fluid treating and dispensing devices, articles, systems, and methods. More particularly, it is related to portable fluid treating and dispensing devices, articles, systems, and methods for potable liquids.

More people are drinking water out of plastic bottles than ever before. Often such water bottles are discarded even though they are reusable. Such practices detrimentally impact the environment. In addition, it takes significant amounts of crude oil to make the plastic water bottles people typically use and discard in a year. Moreover, some retail outlets use significant amounts of space for storing water bottles, thereby diminishing the space they have to sell other products. There is an interest in reusing the water bottles so as to not only reduce detrimental environmental impacts, but also minimize the amount of crude oil that must be used in order to replace discarded water bottles and the like. In addition, there is an interest in enhancing the versatility of treating and dispensing water in a user friendly manner in a wide variety of circumstances.

A variety of water filtration devices are known for treating water for consumers. Typically, there two categories of water filtration devices. One kind includes so-called in-line systems coupled to external sources of fluid and generally require external plumbing as well as have requirements for being sufficiently strong to withstand the attendant pressurization of the fluid. Another kind includes batch units that process water in batches and which require no external plumbing. Examples of batch devices are gravity-fed pitcher/carafes and larger reservoirs in to which water is poured. Pour-through or gravity-fed filtration devices are well-known. They have gained widespread popularity and have numerous uses in variety of environments, such as for example, camping, hiking, boating, and even for emergency preparedness. Many known water filtration devices of the latter category use filtration cartridges that while replaceable are often expensive and relatively difficult to handle.

Often the filtration process used in many filtration cartridges may take several minutes for completion. In addition, these latter devices generally dispense the treated water into a specially constructed container arranged to cooperate with the filtration unit. In other words, the system is not generally compatible with known water bottles, let alone multiple water bottles. Thus, extra steps are often entailed for pouring the contents of the filtration unit into the water bottles. While not necessarily onerous, it may be considered by some to be a more tedious process. It has been suggested that drinking water in bottles is popular because of the healthiness, purity, and taste of the water associated with bottled water. Therefore, there is a desire to provide for such attributes in drinking water under a variety of circumstances. Such circumstances may include, but are not are limited to, drinking water especially for outdoor activities including camping, hiking, boating, and even for emergency preparedness.

While such known water filtration systems have performed satisfactorily, there is nevertheless a continuing interest in making improvements, particularly in view of the limitations and shortcomings noted above.

SUMMARY

The present description is directed to a device for filling a plurality of containers with a liquid. The device comprises: a fluid reservoir assembly for holding a liquid; and a fluid treating unit arranged in fluid communication with the fluid reservoir assembly for treating a liquid in the fluid reservoir assembly, wherein the fluid reservoir assembly and the fluid treating unit allow passage of a liquid therethrough by gravity, and wherein the fluid reservoir assembly includes a plurality of outlets, each of which is for generally diverting a treated liquid into a container.

The present description is directed to a system for filling a plurality of individual containers. The system comprises: a plurality of individual containers for directly receiving a liquid therein; and a device for filling a plurality of the containers with a treated liquid, the device includes a fluid reservoir assembly for holding a liquid; and a fluid treating unit arranged in fluid communication with the fluid reservoir assembly to treat a liquid, wherein the fluid reservoir assembly and the fluid treating unit allows passage of a liquid therethrough by gravity, and wherein the fluid reservoir assembly includes a plurality of outlets each one of which is for generally diverting a treated liquid into one of the individual containers.

The present description is directed to a method of treating and dispensing a liquid to individual ones of a plurality of containers. The method comprises: providing a plurality of containers adapted to receive a treated liquid therein; providing a device for filling a plurality of containers with a treated liquid, wherein the device includes a reservoir assembly for holding a liquid; and a fluid treating unit arranged in fluid communication with the fluid reservoir assembly, wherein the fluid reservoir assembly includes a plurality of outlets, each of which is for generally diverting a treated liquid into an individual container; and introducing a liquid into the fluid reservoir assembly such that a liquid flows through the device under the influence of gravity for treating and dispensing into the containers. The present description includes having the dispensing being performed generally simultaneously.

The present description is directed to a portable potable liquid container comprising: a body including a reservoir and a first fluid opening, and a valve in the first fluid opening for permitting a potable liquid flow into the reservoir.

The present description describes a device for filling a plurality of containers with a treated potable liquid. The device comprises: a fluid reservoir assembly for holding a liquid; and a fluid treating unit arranged in fluid communication with the fluid reservoir assembly for treating a liquid in the fluid reservoir assembly, wherein the fluid reservoir assembly includes a plurality of outlets for generally diverting the treated potable liquid into each one of the containers; the fluid reservoir assembly is collapsible and expandable and in response to being collapsed by manually applied forces urges the treated potable liquid into the containers.

One aspect of the present description is related to fluid treating and dispensing devices, systems, articles and methods, particularly of a gravity-fed type, wherein a potable liquid is expeditiously treated and relatively quickly dispensed directly into a plurality of potable liquid containers, such as water bottles or the like.

Another aspect of the present description is related to treating and dispensing devices, articles, systems, and methods which may treat the potable liquid in a variety of approaches.

Another aspect of the present description is related to treating and dispensing devices, articles, systems, and methods which may add at least one material that at least separates, purifies or changes a liquid.

Another aspect of the present description is related to treating and dispensing water with devices, articles, systems and methods which may use reusable or existing water bottles.

Another aspect of the present description is related to treating and dispensing a potable liquid with devices, articles, systems, and methods which are light-weight, compact, and relatively easily carried as well as storable.

Another aspect of the present description is related to treating and dispensing a potable liquid with devices, articles, systems and methods which present consumer friendly interfaces.

Another aspect of the present description is related to treating and dispensing a potable liquid with portable and reliable devices, articles, systems which are simple and economical to manufacture and operate.

The aspects described herein are merely a few of the several that can be achieved by using the present invention. The foregoing descriptions thereof do not suggest that the invention must only be utilized in a specific manner to attain the foregoing aspects.

BRIEF DESCRIPTION OF THE DRAWINGS

These and other features and aspects of the present description will be more fully understood from the following detailed description of exemplary embodiments. It should be understood that the foregoing descriptions and the following detailed descriptions are exemplary and are not restrictive of the present description.

DETAILED DESCRIPTION

According to the present description, provisions are made to improve upon the above noted drawbacks and shortcomings of fluid treating and dispensing potable liquids into multiple fluid containers, such as water bottles, by highly reliable and low cost approaches.

The words "a," "an," and "the" are used interchangeably with "at least one" to mean one or more of the elements being described. By using words of orientation, such as "top," "bottom," "overlying," "front," and "back" and the like for the location of various elements in the disclosed articles, we refer to the relative position of an element with respect to a horizontally-disposed body portion.

Figure 1:
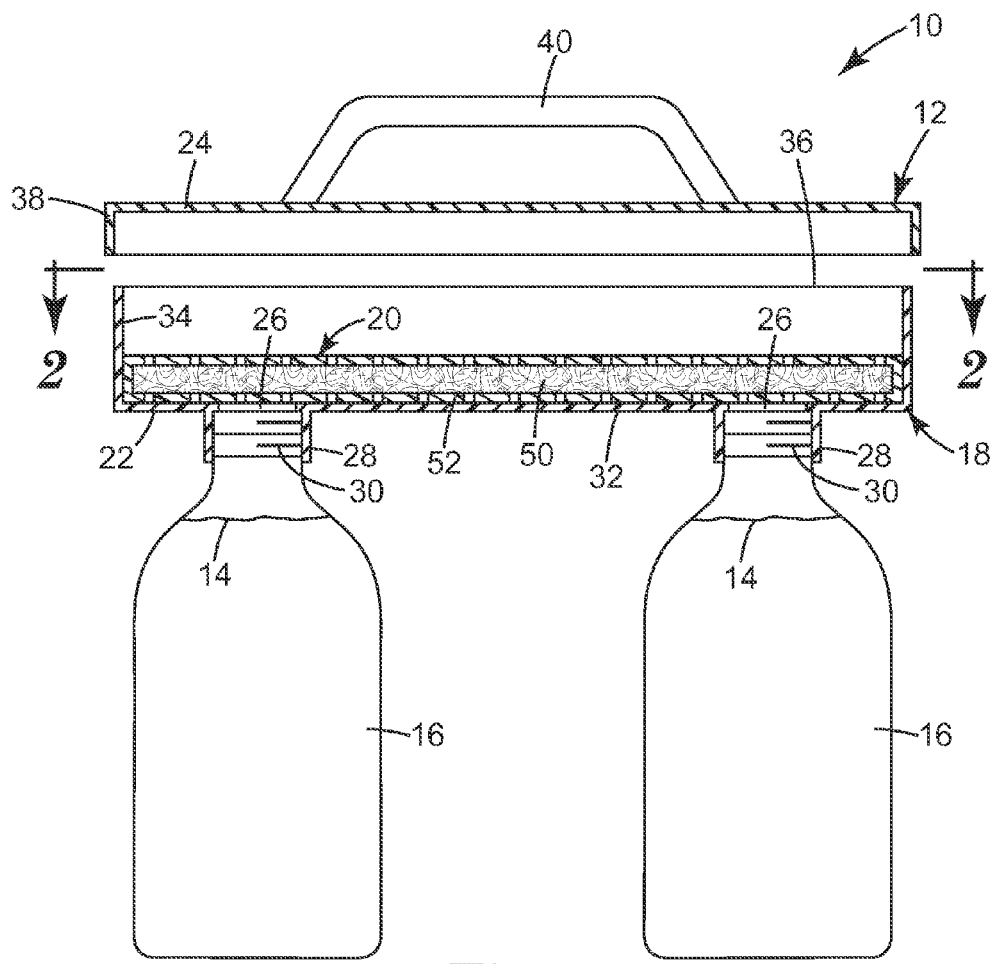
FIG. 1 is a schematic elevation view of one exemplary embodiment of a portable fluid treating and dispensing device or apparatus according to the present description.
Figure 2:
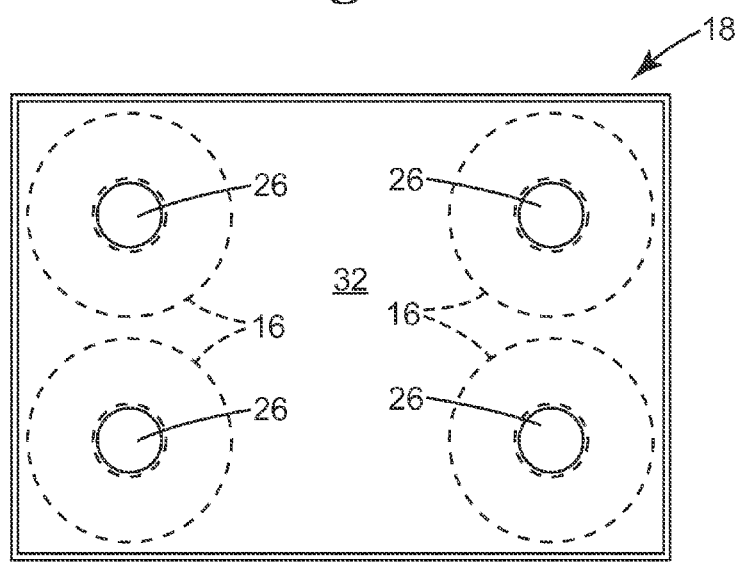
FIG. 2 is a schematic plan view, taken along line 2-2 in FIG. 1, of the fluid treating and dispensing apparatus illustrated in FIG. 1, but with elements omitted for purposes of clarity in illustrating components of the portable fluid treating and dispensing apparatus.
Figure 3:
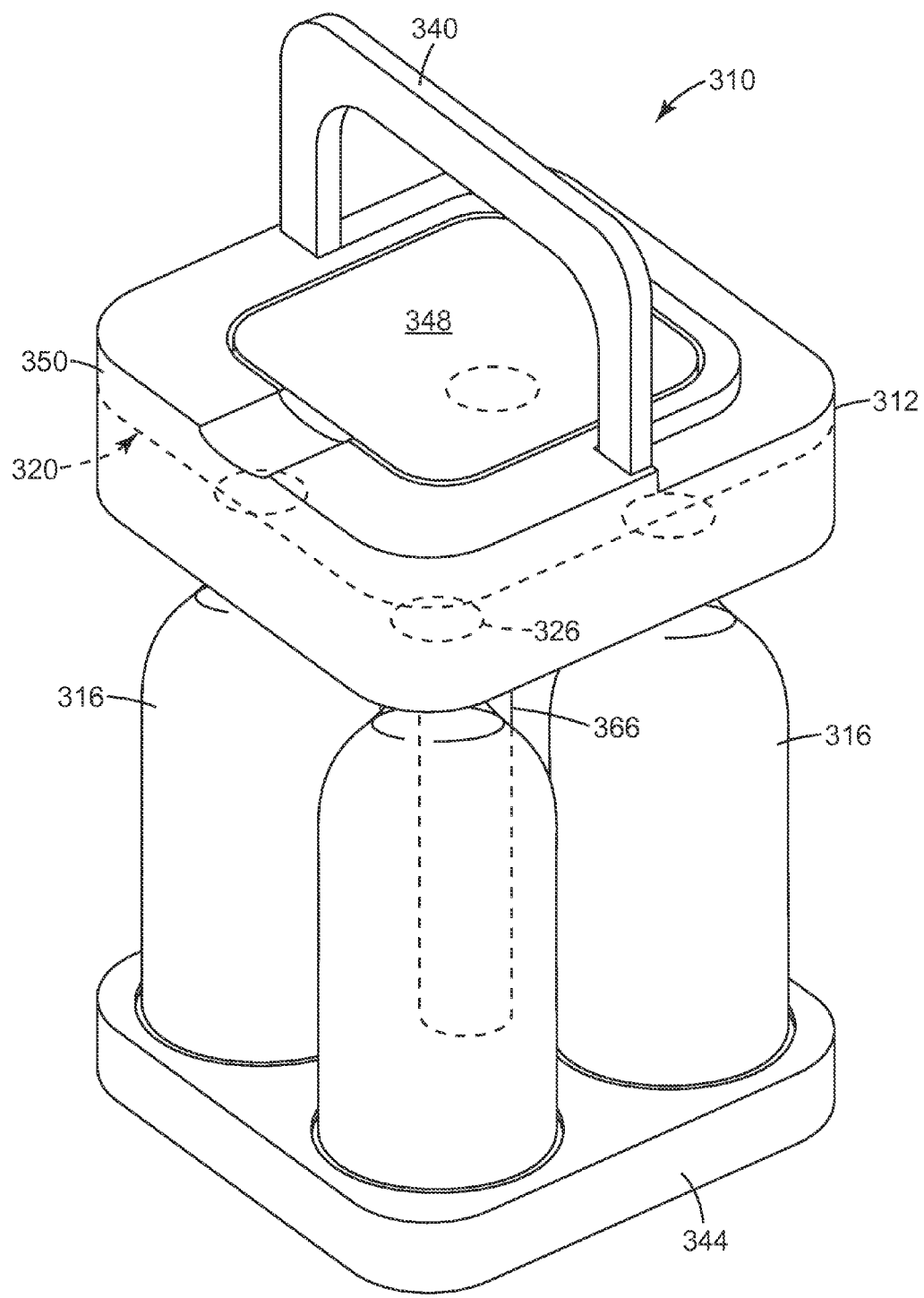
FIG. 3 is a schematic perspective view of another exemplary embodiment of a portable fluid treating and dispensing device or apparatus.

Reference is made to FIGS. 1-3 for illustrating exemplary embodiments of the present description. The present description is directed generally to a fluid treating and dispensing system 10 for treating and dispensing a fluid, such as a liquid, a potable liquid including but not limited to, potable water, beverages, and the like. While potable drinking water is described, it will be understood that other non-potable liquids may be treated as well in a manner that is consistent with the present description. In particular, the fluid treating and dispensing system 10 includes a reservoir and a treating or filter housing assembly 12 that is portable and adapted to treat and dispense water 14, generally simultaneously, into a plurality of individual fluid containers 16 that are removably coupled to a fluid reservoir housing assembly 18. The individual fluid containers 16 may, in the exemplary embodiments, be known types of water bottles 16 or the like that are reusable.

In the exemplary embodiment of FIGS. 1-2, the reservoir and filter housing assembly 12 that includes the fluid reservoir housing assembly 18 receives a liquid, such as water, a potable liquid, or the like and a treating assembly or unit 20 that is adapted to treat the liquid in any one of several ways as will be described. In one exemplary embodiment, the fluid reservoir housing assembly 18 may include a two-piece molded plastic container 18 that includes a rectangular housing tray portion 22 and a cover 24 that is removably coupled to the former to form a closable container. Any suitable approach for removably joining the two may be utilized. The fluid reservoir housing assembly 18 may have a variety of shapes and sizes and sufficient volume to allow filling of multiple bottles generally simultaneously. This approach is highly advantageous because several bottles will be expeditiously filled with treated water. In this exemplary embodiment, the reservoir and filter housing assembly 12 is a gravity-fed type device. As such, a user merely pours water into the fluid reservoir housing assembly 18 and, by reason of gravity the water is treated by the treating assembly 20.

In one of the exemplary embodiments, it is contemplated to have the fluid treating and dispensing system 10 sized to have a relatively compact footprint comparable to, for example, a footprint for a typical gallon of bottled water. The compact construction allows it to be storable in, for example, a refrigerator or the like.

The fluid reservoir housing assembly 18 includes a plurality of outlet openings 26 that may correspond to the number of water bottles to be filled at one time. The fluid reservoir housing assembly 18 includes a plurality of connecting portions 28, each of which is constructed to have a releasable connection to a respective one of the water bottles. In the exemplary embodiment, the connecting portions 28 have internally threaded segments 30 adapted to threadedly cooperate to the external threads (not shown) on a neck of a water bottle, such as illustrated in FIG. 1. Other suitable known approaches for effectuating a releasable connection may be used.

Both the tray portion 22 and the cover 24 may be made of suitable materials for use in treating and dispensing potable liquids, such as potable water. Such materials may be selected to meet food-contact standards established by private and government entities. Typically, the tray portion and cover may be made of suitable thermoplastic polymer materials typically used in liquid containers. Such materials are generally light-weight so as to facilitate portability. The thermoplastic polymer materials that are utilizable may include, but are not be limited to, polyethylene terephthalate (PET), polycarbonates, polypropylene, and the like. More typically, the thermoplastic polymer material may be transparent and have sufficient strength to withstand sanitizing for enabling its reuse. Other suitable materials, such as thermosetting plastics, composite materials, metals, and combinations thereof may be used.

In this exemplary embodiment, the tray portion 22 may have a rectangular shaped base 32 with an upstanding sidewall 34 that defines an opening 36 shaped for removably receiving the treating assembly 20 as well as the drinking water to be treated. The cover 24 includes a peripheral lip 38 that is sized and shaped to releasably and sealably engage a sidewall of the tray portion 22 for effectuating a sealing relationship therewith. The present description is not limited to a tray portion 22 and cover 24 having this particular construction, since a wide variety of constructions and sizes are contemplated. The cover 24 may also include at least one carrying device 40, such as a handle 40 or the like to assist in portability. The handle 40 may be a generally U-shaped handle that is attached to the cover 24 to fold and fit within a recess (not shown) of the latter. The handle 40 or other suitable carrying device may also be attached to the tray portion 22.

In the illustrated exemplary embodiment, the treating assembly 20 broadly includes a treating material 50 that may treat the water by at least one of separation, purification, and effectuating a change in the water and/or components therein. The treating materials used may take a variety of forms and be comprised of a variety of compositions. Moreover, the type of treating that may be used includes, but is not limited to, separation by filtering, but includes adsorption, absorption, agglomeration, flocculation, ion exchanges, as well as other known processes. The treating material 50 may effectuate separation by separating a component from the water, as by a suitable filtration material that physically removes the components. Filtration may include micro filtration, and ultra filtration. Typical examples of filter constructions include, but are not be limited to, a bed of crystals, granules, resins, particles and the like as well as any combination thereof or a self-supporting member.

In the in the illustrated embodiment, the treating material 50 may be a self-supporting filter member 50, such as a filter membrane 50. The filter membrane 50 may be made a web membrane that may be made of a suitable material that includes, but not limited to, woven fibers and/or non-woven fibers; thermoplastic polymeric materials, such as polyethylene terephthalate (PET), polycarbonates, polypropylene, polyester resins that are semi-crystalline materials, such as polybutylene terephthalate (PBT); thermosetting plastics; metals; ion-exchange resins; ceramics; activated carbon; and the like.

The foregoing filter materials, besides effectuating separation of impurities, may be treated with materials to effect purification and/or other changes to the water. Purification and change may take place by materials that enhance the water, sterilize the water, chemically treat and/or biologically treat the water. Purification and changes may take place using a wide variety of known materials. Typical materials for chemically induced purification and changes in water include, but are not limited to, chelating agents, ion-exchange resins, metals (e.g. silver), ceramics, chlorinating agents, and zeolites. Typical materials for biologically inducing purification and changes in water include antimicrobial materials and the like. Other typical materials for inducing changes to the water may include treating the water so as to effect: enhancements, as by suitable additives that include but are not limited to minerals, compositions (e.g., sodium bicarbonate) and the like. The enhancements may improve taste, color, odor, aesthetic appearance, and the like. Other changes may be induced by materials that will bring about sterilization of the water as by using chlorinating materials.

Referring back to the illustrated exemplary embodiment, the self-supporting filter membrane web 50, it may be made of carbon-loaded thermoplastic, such as PET, that functions to not only separate physically components from the water, but treat the water with activated carbon.

In addition, porosity values of whatever filter material is used may provide for not only the treating of the drinking water, but also enhances flow rate of the water being treated. This is for expeditiously filling the water bottles simultaneously and relatively rapidly. It will be understood that the porosity range values are related to the type of filtering to be accomplished and the kind of fluid being treated. According to the present description, the filter material 50 for treating drinking water may allow water to flow, at room temperature, between 0.250 and 2.50 gallons per minute (gpm). In one exemplary embodiment, the filter material 50 may be a carbon loaded membrane 50 that is commercially available. While a filter membrane 50 in the form of a web is disclosed, it will be understood that a variety of other materials used for treating a potable liquid may be used. The foregoing ranges and these materials should not be considered to be limiting but merely illustrative.

The filter material 50 may be housed in a container or housing 52. The container 52 may be in the form a porous molded plastic container 52 that includes a base and a removable cover into which the filter material 50 is placed. The filter material housing 52 may be placed over the outlets to allow flow into the water bottles. Other suitable approaches are envisioned for positioning the filter material relative to the outlets. While not illustrated, the present description envisions that the filter may be slid (not shown) into the housing assembly as a unit, or even integrally connected (not shown) to the housing assembly. Also, a plurality of individual filter materials (not shown) instead of a single material, as illustrated, may be placed in overlying relationship to corresponding ones of the outlets.

Reference is now made to FIG. 3 for illustrating another exemplary embodiment of the present description. This exemplary embodiment while similar to that described and illustrated in FIGS. 1 and 2 differs in that the fluid treating and dispensing system 310 is provided with a generally rectangular stand 344 for carrying and stabilizing each of the water bottles 316 during storage and transport. The stand 344 may be connected to the reservoir and filter housing assembly 312 as by a post 366. The stand 344 is spaced so as to allow for easy insertion and removal of the water bottles. In addition, a lid 348 covers a fill opening (not shown) in the reservoir and filter housing assembly 312. Also, the treating assembly 320 including the filter material 350 may be supported by suitable structure (not shown) to be directly beneath the fill opening instead of immediately over the outlets. The treated potable water will flow through the openings 326 generally simultaneously. A handle 340 is connected to the fluid reservoir housing assembly.

Figure 4:
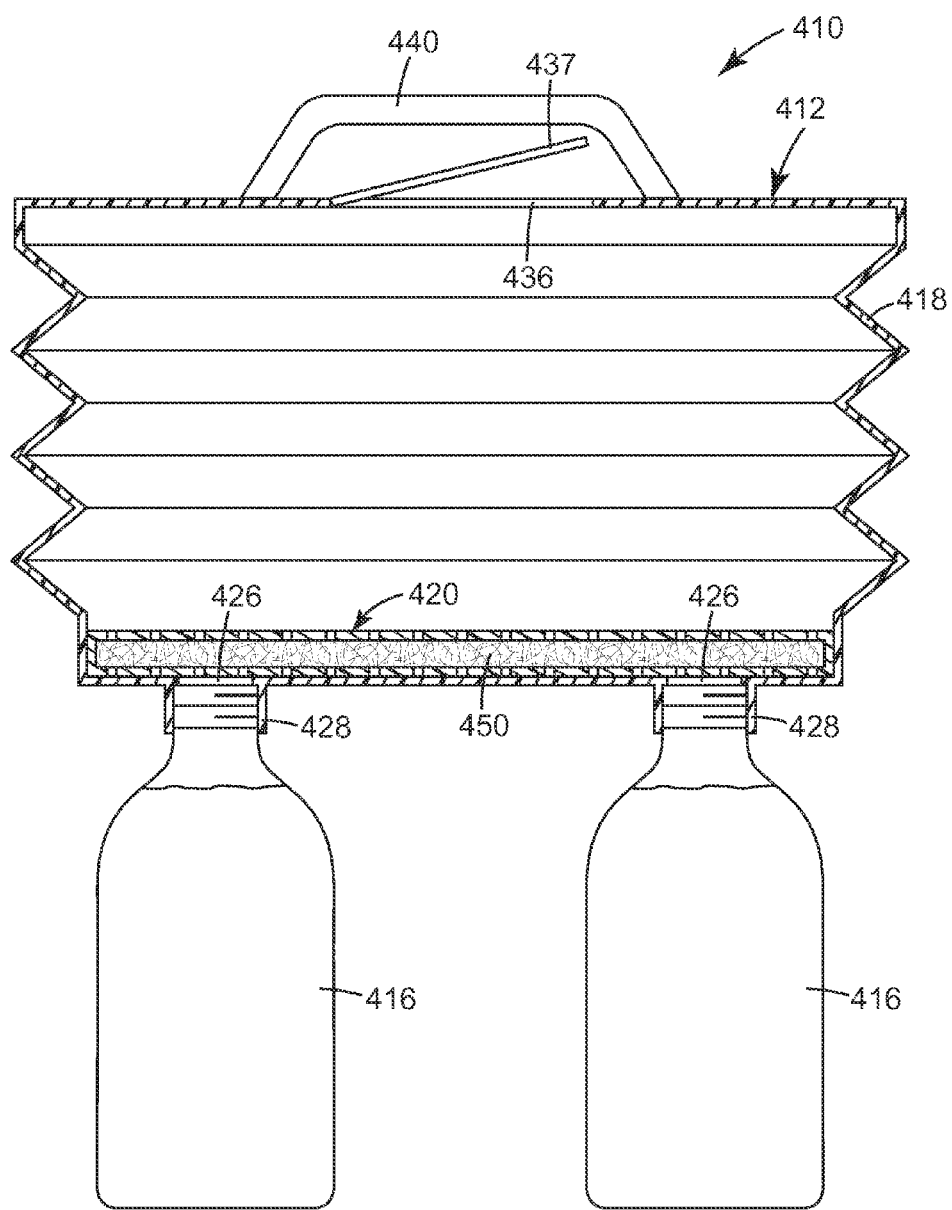
FIG. 4 is a schematic perspective view of yet another exemplary embodiment of a portable fluid treating and dispensing device or apparatus according to the present description.

Reference is now made to FIG. 4 for illustrating another exemplary embodiment of a fluid treating and dispensing system 410 made according to the present description. In this exemplary embodiment the reservoir and filter housing assembly 412 has a construction in which pressure may be manually externally applied thereto in order to force the drinking water through a treating assembly 420 including a filter material 450 and eventually into multiple water bottles 416 that are releasably connected to threaded portions 428 of the fluid reservoir housing assembly 418. In this exemplary embodiment, a fluid reservoir housing assembly 418 includes a collapsible and expandable bellows 418. The collapsible and expandable bellows 418 is made of materials which may be selected to allow it to be used for consumable purposes, as noted above. In addition, the material may be light-weight, durable, as well as possess physical properties that allow it to retain the water while the water is forced through a treating assembly 420 and outlet openings 426 in response to being manually compressed.

The collapsible and expandable bellows 418 has an inlet opening 436 at one end that is closable by a lid 437. At least one handle 440 is provided that may be connected to the reservoir and filter housing assembly 412. Also, a user may employ the handle 440 to manually compress the bellows and force the water through the treating assembly 412. Advantageously, the collapsible and expandable bellows 418 is compressible for storage and transportation purposes.

While an expandable and collapsible bellows 418 is illustrated, it will be understood that other kinds of compressible and expandable fluid supply housings may be used. For example, a collapsible bag or the like may be used as a fluid supply housing. In such an arrangement, a treating assembly may be located internally of the collapsible bag. The present description includes other types of configurations capable of manually pumping the fluid.

Figure 5A:
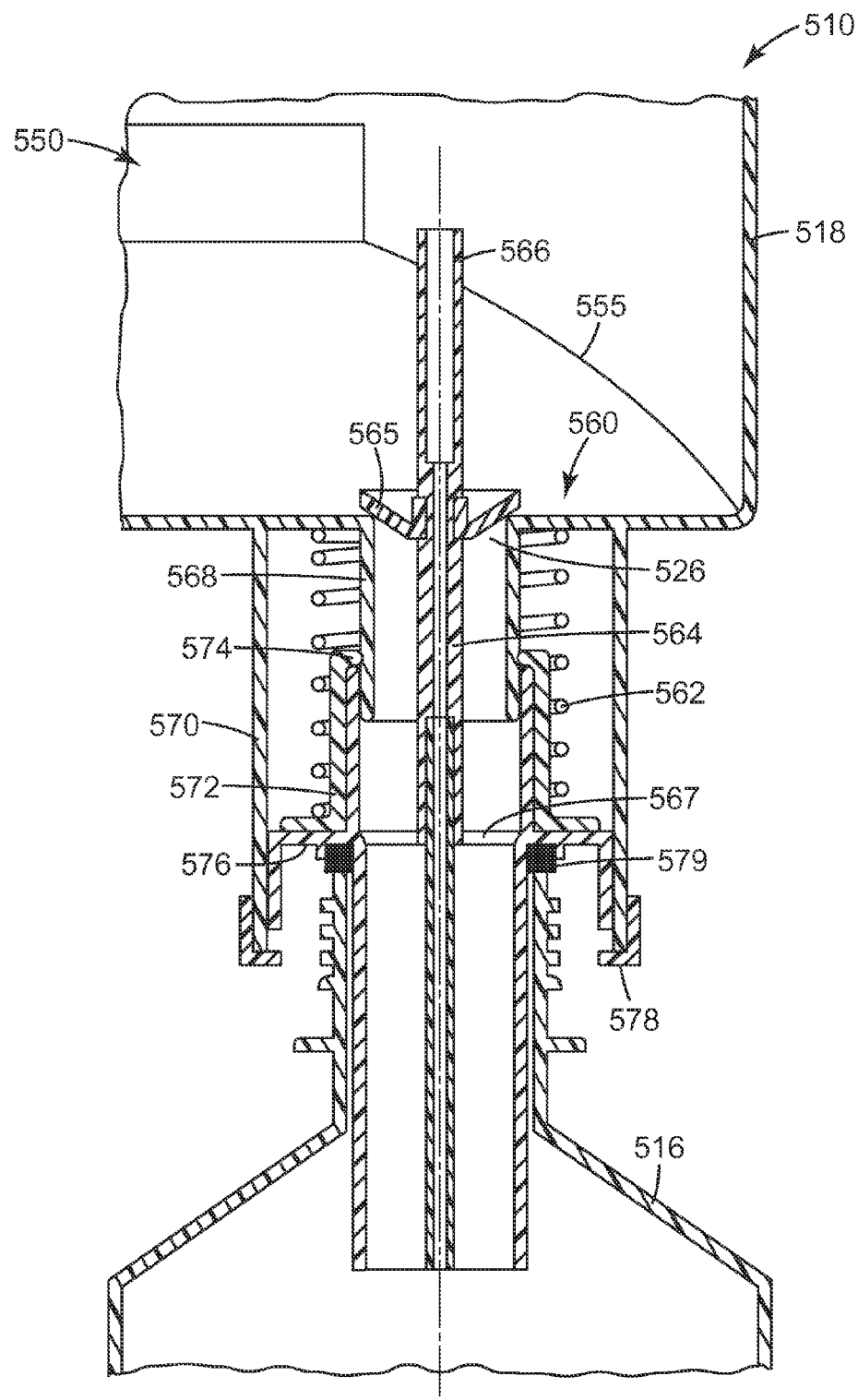
FIGS. 5A-C are elevation views, in cross-section, of one exemplary embodiment of a filling sequence for filling a water bottle from a portable fluid treating and dispensing apparatus made according to the present description.
Figure 5B:
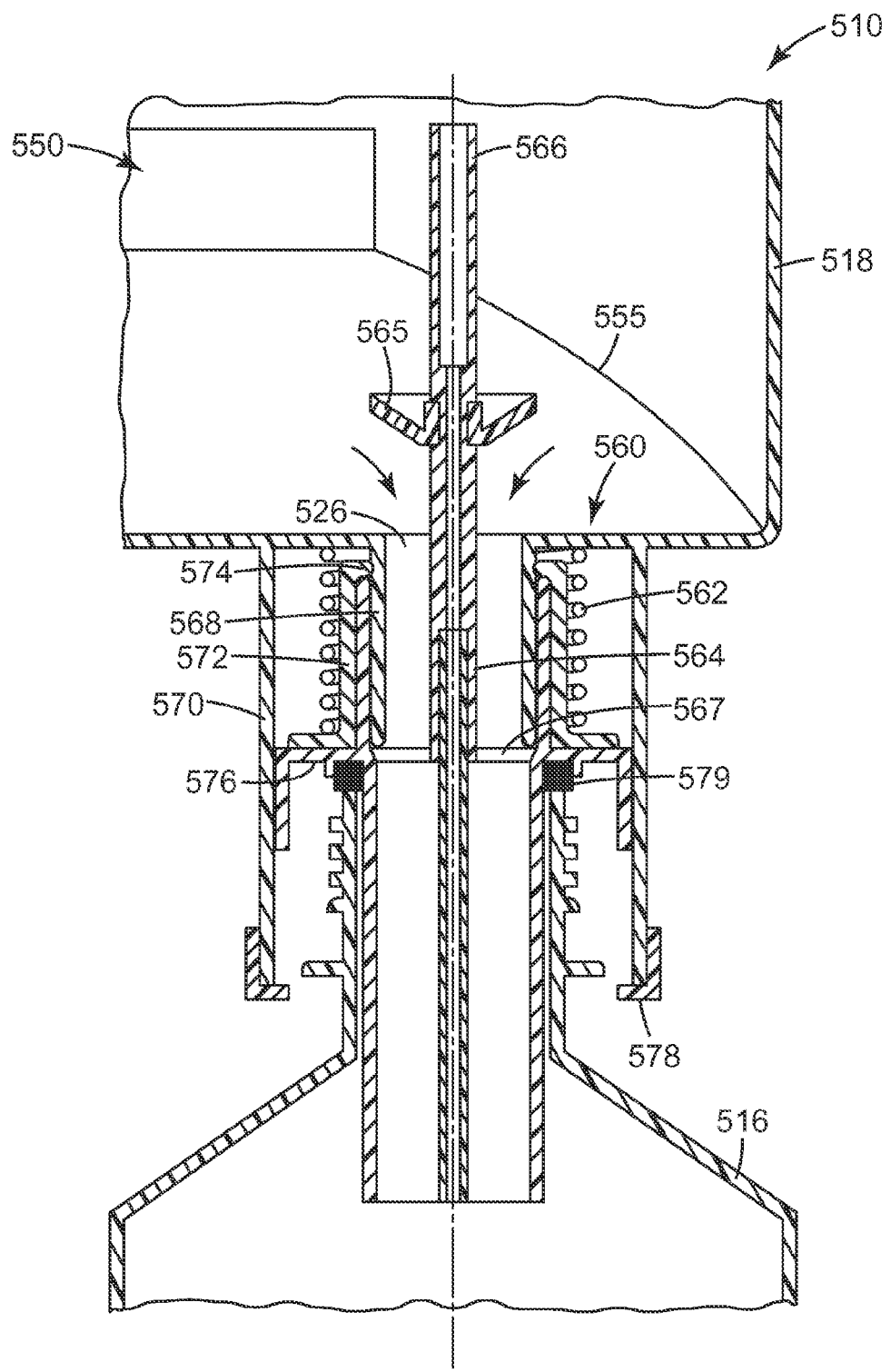
Figure 5C:
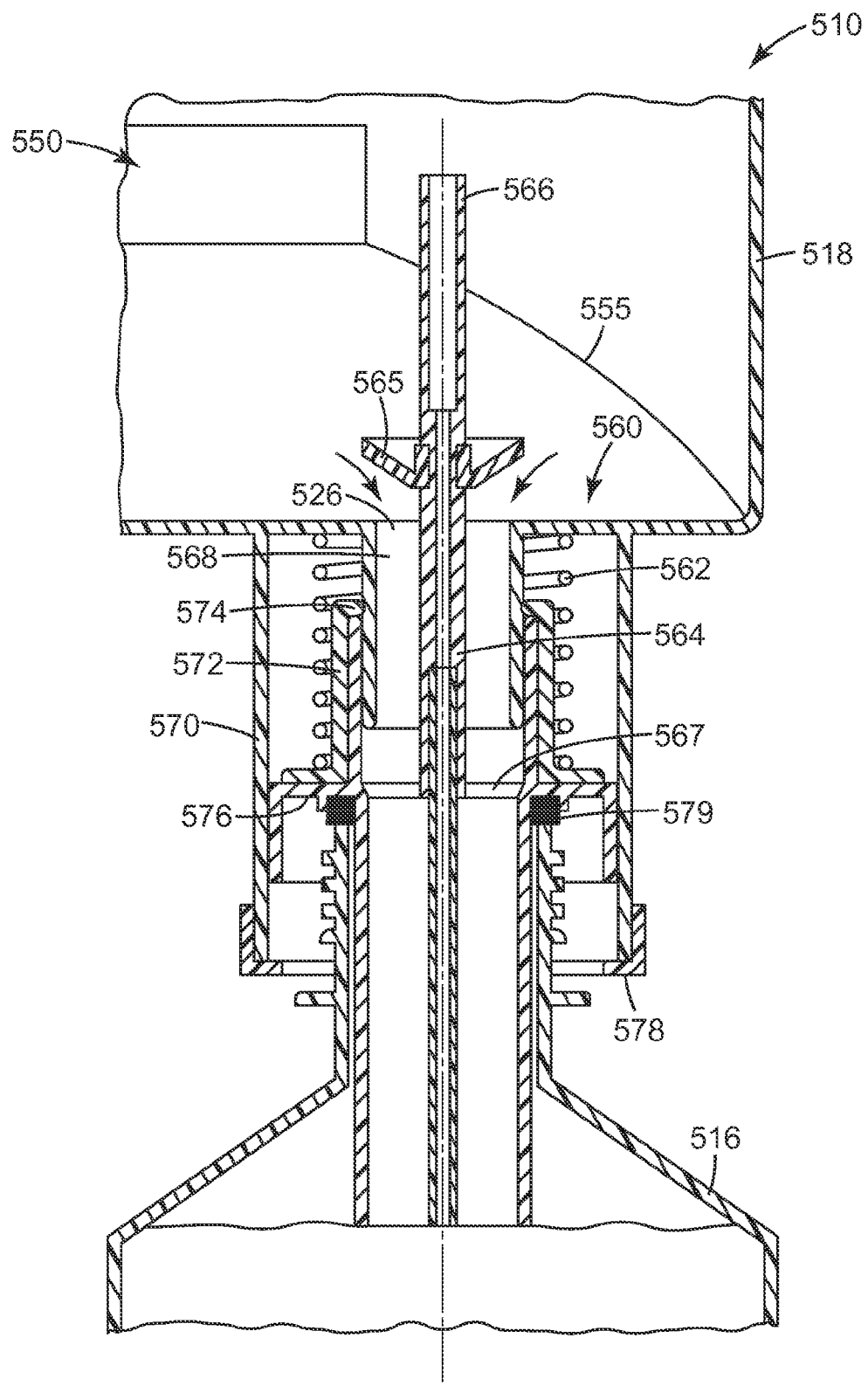

Reference is made to FIGS. 5A-C to illustrate another exemplary embodiment of the present description which shows the filling of a water bottle. Advantageously, this exemplary embodiment presents a fluid treating and dispensing system 510, wherein not all multiple water bottles 516, potentially securable, are, in fact, secured to a fluid reservoir housing assembly before filling takes place. In the previous exemplary embodiments, all the water bottles had to be connected before the simultaneously filling could take place. In this exemplary embodiment, a valve mechanism 560 may be associated with each outlet so as to retain the water until otherwise opened. Accordingly, simultaneous filling of less than all the bottles is permitted. In the exemplary embodiment, the valve mechanisms 560 are to be operated in response to insertion and removal of individual ones of the water bottle 516 for opening and closing the outlet 526, respectively. Other valve constructions and methods of operation are envisioned by the present description.

In the illustrated exemplary embodiment, the valve mechanism 560 is a biased one-way valve that allows filling of standard types of fluid containers, such as water bottles 516 that do not have a valve, but may be, in fact, commonly available water bottles. While the valve mechanism may be a one-way valve, the present description envisions that the valve be any known type that is actuable for opening and closing. The valve mechanism 560, in the illustrated embodiment, may include a coil spring 562 that surrounds a tubular plunger valve member 564 and urges the latter downwardly, as viewed in FIG. 5A. As such, an umbrella shaped seal member 565 attached to one end of the plunger 564 is urged to engage a bottom surface of the reservoir housing 518 to seal the opening 526 and block fluid flow. The plunger 564 includes a vent 566 extending longitudinally thereof to facilitate setting the water level in the water bottle 516 during filling as will be explained. The vent 566 may be an elongated tube that has a radial connection as by radial web 567 to the inside of the plunger 564 so as to move therewith and carries the seal member 565 therewith. Both the plunger and the vent are adapted to enter the bottle 516, as illustrated, and the location of the distal end of the vent tube will control the level of the water in the bottle (see FIG. 5C). The other end of the vent extends through a wall 555 that leads to a compartment that may be at ambient pressure. The wall 555 may be disposed adjacent to contained filter material 550.

The valve mechanism 560 includes a pair of inner and outer concentric tubular sleeve portions 568 and 570 surrounding the opening 526. A sealing member 572, having the configuration illustrated, rests on the plunger 562 and has a distal end 574 in sliding sealing engagement with an outside surface of the inner sleeve portion to prevent leakage therepast. The coil spring 562 is located between the sleeve portions 568 and 570 and rests against a flange 576 on the plunger 562. An annular retainer 578 retains the coil spring 562 and the plunger 562 to the reservoir housing. An O-ring 579 is connected as illustrated.

In FIG. 5A, the O-ring seal 579 is adapted to be engaged by and seal an open end of one water bottle 516 prior to filling. As such, both the plunger and the vent are adapted to be inserted into the bottle. To open the valve mechanism, as seen in FIG. 5B, the water bottle will force the plunger 564 upwardly, against the bias of the coil spring 562, thereby lifting the umbrella valve member from sealed engagement with the reservoir seal assembly and open the outlet to allow filling of the water bottle with water from the reservoir housing. In FIG. 5C, the user allows the water bottle to rest on a surface (not shown). The surface, such as a stand surface, is spaced such that the coil spring 562 drives the bottle downwardly. The play of the coil spring 562 is not enough to close the valve mechanism. However, the vent 566 will allow air in the bottle to be displaced and exit during filling. Once the water level rises to block the distal end of the vent 566, the compressed air remaining in the bottle sets the fill level in the bottle without spillage being an issue. It will be appreciated that removal of the water bottle following filling will allow the coil spring to return the plunger to its original condition (see FIG. 5A) and close the valve mechanism 560. Advantageously, the reservoir and filter housing assembly permit independent filling of water bottles and permits carrying of the former without the necessity of all or any of the water bottles being attached. As such, the present embodiment affords significant versatility in that known water bottles without valves may be easily and simply filled.

Figure 6:
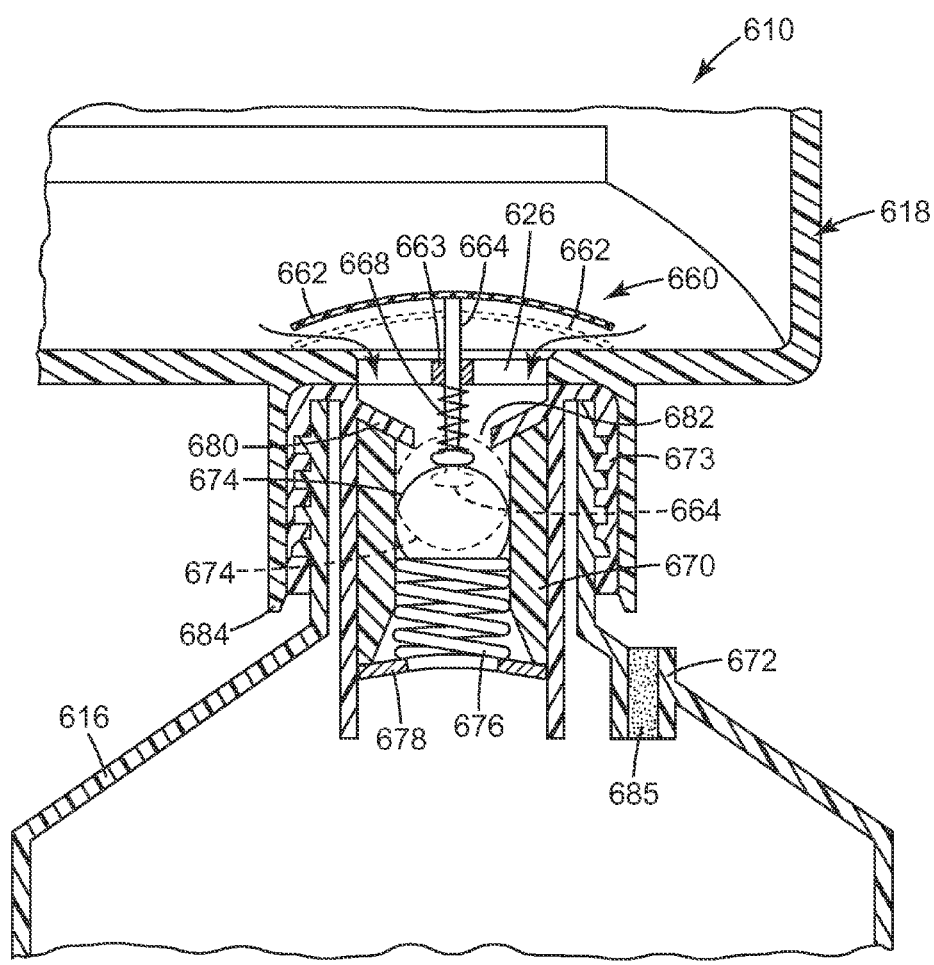
FIG. 6 is a schematic view of another exemplary embodiment for filling a water bottle from a portable fluid treating and dispensing apparatus made according to the present description.

Reference is now made to FIG. 6 for illustrating yet another exemplary embodiment of a fluid treating and dispensing system 610 of the present description which shows the filling of a water bottle 616, but with a valve mechanism 660 in the reservoir assembly 618, and a check valve 670 and an air vent 672 incorporated in the bottle. Advantageously, this exemplary embodiment presents a fluid treating and dispensing system 610, wherein not all multiple water bottles, potentially securable, are, in fact, secured before filling may take place.

The valve mechanism 660 includes an umbrella-shaped valve member 662. The valve member 662 includes a plunger 664 that slides through a central wall 663 supported as by radial webs (not shown) in an opening 626 in the reservoir assembly 618. A coil spring 668 is connected to and between the reservoir assembly 618 and the plunger 664 and biases the valve member 662 downwardly as viewed in the drawing. This causes the valve member 662 (phantom line position) to rest against a bottom surface of the reservoir housing 618 and close the outlet 626.

Water will be dispensed when the water bottle 616 is forced against the valve mechanism 660. In this regard, the water bottle 616 includes a one-way check valve 670 in a water bottle cap 673 that is threaded to the bottle. The one-way check valve 670 includes a ball element 674 that is normally biased by a coil spring 676 to a closed position (see phantom line position) against a wall 680 defining an opening 682. A retainer 678 holds the one-way check valve 670 in place in the bottle cap 673. The retainer 678 may be a thin member that allows water to flow therepast when the one-way check valve 670 is opened.

To open the one-way check valve 670, the water bottle cap 672 is fit within a sleeve 684 as illustrated. The user lifts the water bottle until the ball element 674 is forced against the end of the plunger 664. This action is such that not only is the ball element 674 displaced from the wall 680, thereby opening the water bottle but the umbrella-shaped valve member 662 is displaced away from the surface to the solid line position. Accordingly, water is allowed to flow from the reservoir housing through the opening 626 and into the water bottle 616. Removal of the water bottle 616 will allow both the valves to close. In the present exemplary embodiment, the air vent 672 is provided in the water bottle. The air vent 672 allows air to exit the water bottle during filling. The air vent 672 may be made of a material 685 that is liquid impervious, but allows air and other gases to escape. A variety of materials may be selected to provide the foregoing functionality, such as a polymeric micro-fiber material. An example of such a material is Thinsulate™ that is commercially available from 3M Corporation, St. Paul, Minn. Also, while the foregoing valve and materials are described, the present description envisions other kinds of equivalent valves and materials.

Figure 7:
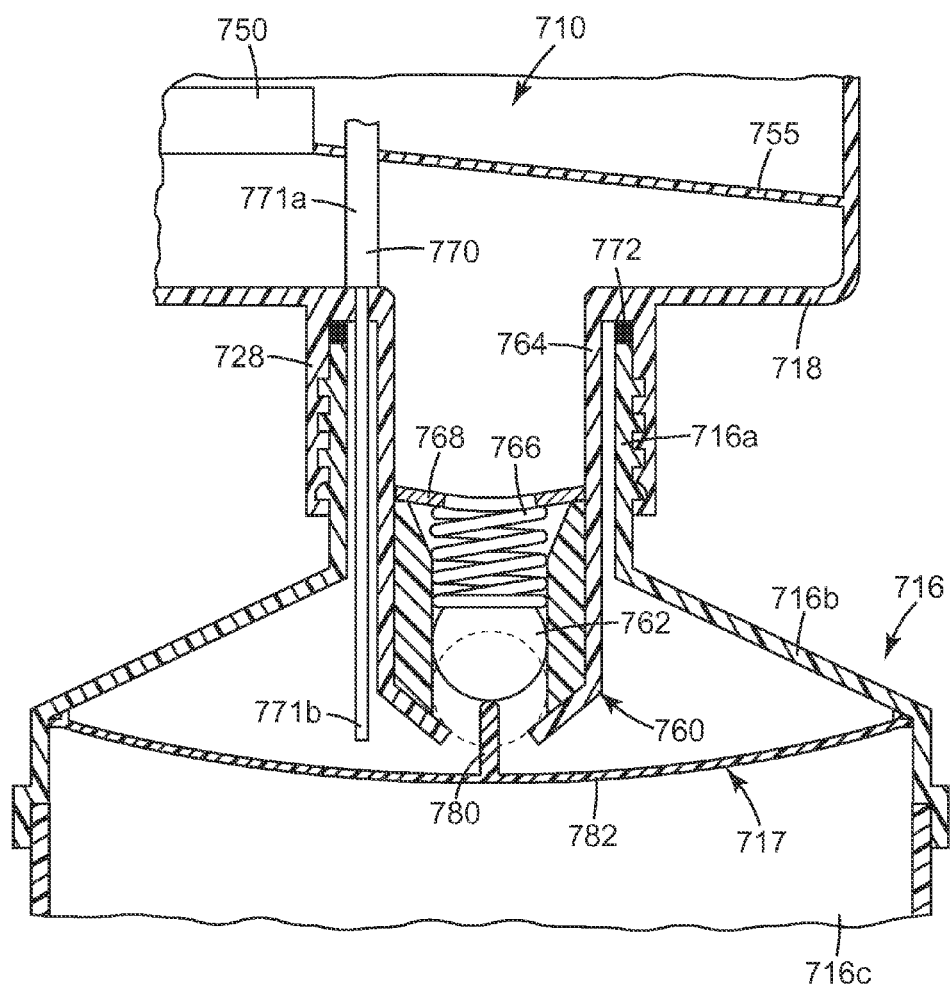
FIG. 7 is a schematic view of another exemplary embodiment for filling a water bottle from a portable fluid treating and dispensing apparatus made according to the present description.

Reference is now made to FIG. 7 for illustrating yet another exemplary embodiment of a fluid treating and dispensing system 710 of the present description which shows the filling of a water bottle 716 from the top down. This exemplary embodiment differs from the foregoing in that the water bottle 716 includes an internal actuator 717 that operates a one-way displacement valve 760 that is associated with the reservoir housing assembly 718. The displacement valve is adapted and sized to fit within an open water bottle. The one-way displacement valve 760 in the exemplary embodiment may be a check valve 760 in a depending housing member 764 that has its ball element 762 biased to the closed condition (see phantom lines) by a coil spring 766 held by a retainer 768 similar to that described above in the previous exemplary embodiment. The reservoir housing 718 is provided with a vent tube 770 that has one end 771*b* adapted to fit within an opening of the water bottle 716, while the other end 771*a* is adapted to pass through a wall 755 into an ambient pressure space within the fluid reservoir housing assembly 718. The wall 755 may be disposed adjacent the filter material 750. The vent tube 770 may be made of any suitable material and is adapted to set the fill level of the water in the water bottle 716 while avoiding spillage. An O-ring seal 772 is seated against the reservoir housing 718, as illustrated, to provide a seal for the open end of the water bottle 716 and the vent tube 770 during filling. The water bottle 716 has a neck 716*a* with external threads that threadedly engage threads of an outlet opening portion 728. When fully engaged, the actuator 717 is operable. In this exemplary embodiment, the actuator 717 may have an upstanding actuator element 780, as viewed in the drawing that opens the check valve 760 to allow fluid to flow into the open mouth of the water bottle 716. Filling will continue until the drinking water level is set by the vent tube 770 as explained above in the previous exemplary embodiment. Removal of the water bottle 716 will allow the check valve 760 to close under the biasing of the spring 766.

The water bottle 716 of this exemplary embodiment may be comprised of multiple pieces (e.g., two-pieces) that have a quick-connect construction with each other. Other suitable approaches for connecting the pieces are envisioned. The water bottle 716 may include a separable top portion 716*b* and a bottom portion 716*c*. The separability of the water bottle 716 allows it to be easily sanitized and reused. The actuator 717 may be a bowed member 782 that centrally carries the actuator 780 that is arranged to engage and displace the ball element 762. The actuator 717 may be a thin plastic element having the configuration shown and which may be secured to the inside of the top portion 716*b* as by sonic welding, or any other suitable attachment or joining approach used for securing members together. The bowed member 782 allows fluid to flow therepast. Advantageously, this exemplary embodiment presents a fluid treating and dispensing system 710, wherein not all multiple water bottles 716, potentially securable, are, in fact, secured before filling may take place.

Figure 8:
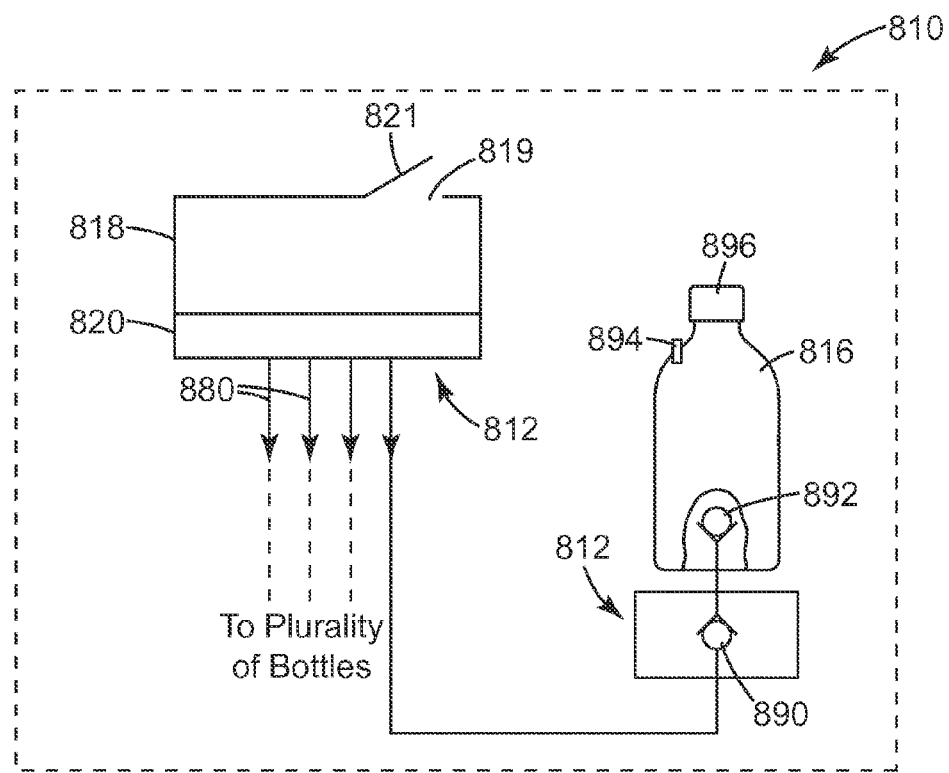
FIG. 8 is a schematic view of another exemplary embodiment for filling a water bottle from a portable fluid treating and dispensing apparatus made according to the present description

FIG. 8 represents a schematic version of a so-called bottoms-up type of fluid treating and dispensing system 810 used for filling simultaneously water bottles 816 through a bottom wall of each of the water bottles. In this exemplary embodiment, the reservoir and filter housing assembly 812 may include open compartments (not shown) for removably receiving therein individual water bottles 816, only one of which is illustrated, so as to be filled from a single fluid reservoir housing assembly 818 of the reservoir and filter housing assembly 812. In such an exemplary embodiment, the fluid reservoir housing assembly 818 includes an inlet 819 that allows water to be poured into it. The inlet 819 may be provided with a lid 821. The treating unit or assembly 820 may be suitably mounted beneath the inlet 819, as by any appropriate structure (not shown). Water in the fluid reservoir housing assembly 818 flows though each of the plurality of respective channels 880 in fluid communication therewith and flows to a corresponding one of the one-way reservoir valves 890 that may be located in the base of the reservoir and filter housing assembly 812. The one-way reservoir valves 890 may include a spring-biased valve member.

In this approach, each of the cooperating bottles 816 may be provided with an actuatable valve member, such as a one-way fluid bottle valve 892, an air vent 894 and a cap 896 covering the mouth or inlet of the water bottle 816. The one-way bottle valve 892 may be located in a bottom wall of the water bottle. A variety of one-way valves 892 may be used. In this exemplary embodiment, the one-way valve 892 includes a spring biased check valve member that is normally closed. The air vent 894 may be similar to that described above in FIG. 6. The bottle cap 896 may be provided with a valve of the kind described above or may be a known type of bottle cap without a valve. The one-way valve 892 of the bottle opens in response to engaging the reservoir valve 890 located in the fluid reservoir housing assembly 818. The cooperation of such valves is similar to the operation described in regard to FIG. 6. Once both valves are open, a pressure head of fluid in the fluid reservoir housing assembly 818 is responsible for filling the water bottles. Although mutually opening valves are illustrated, it will be appreciated that other actuatable valve mechanisms or arrangements may be provided, whereby, for example, the valves are independently manually opening.

This invention may take on various modifications and alterations without departing from the spirit and scope of the present description. Accordingly, this present description is not limited to the above-described exemplary embodiments, but is to be controlled by limitations set forth in the following claims and any equivalents thereof. This present description also may be suitably practiced in the absence of any element not specifically disclosed herein. All patents and publications noted above, including any in the Background section are incorporated by reference into this document in total.

What is claimed is:

1. A device for filling a plurality of containers with a liquid, the device comprising:
   a fluid reservoir assembly including a housing for holding a liquid; and
   a fluid treating unit arranged in fluid communication with the fluid reservoir assembly for treating a liquid in the fluid reservoir assembly, wherein the fluid reservoir assembly and the fluid treating unit allow passage of a liquid therethrough by gravity, and wherein the fluid reservoir assembly includes a plurality of—outlet portions each including an outlet opening and a valve fluidly associated with the corresponding outlet opening, and further wherein the valve is biased to a normally closed mode to prevent liquid from flowing through the corresponding outlet opening and is configured to transition to an open mode to permit liquid to flow through the corresponding outlet opening only when operatively engaged by a portion of one of the containers;
   wherein each of the plurality of outlet portions are configured such that when the portion of one of the containers is disengaged from the valve, the entire valve assembly remains associated with the outlet opening.

2. The device of claim 1, wherein the fluid reservoir assembly is constructed to generally simultaneously divert a treated liquid into the plurality of outlet openings.

3. The device of claim 1, wherein the fluid reservoir assembly includes a collapsible and expandable reservoir.

4. The device of claim 1, wherein the fluid treating unit includes a material that treats a liquid to make it a potable liquid.

5. The device of claim 4, further wherein the fluid treating unit material comprises at least one material from a group of materials that affects at least one of:
   a physical separation of components from a potable liquid, a taste of a potable liquid, an odor of a potable liquid, clarity of a potable liquid, flavor of a potable liquid, aesthetics of a potable liquid, a chemical treatment of a potable liquid, a biological treatment of a potable liquid, a sanitizing treatment of a potable liquid, and combinations thereof.

6. The device of claim 1, wherein each of the outlet portions includes an internally threaded connecting portion configured to provide a releasable coupling connection to an individual container.

7. The device of claim 6, which provides for a quick flow rate of a liquid being treated.

8. The device of claim 7, wherein the device provides a flow rate in a range of from about 0.250 gpm to about 2.50 gpm.

9. The device of claim 4, wherein the fluid treating unit material includes a filter material made from at least one of a group of materials consisting of:
   woven fibers and/or non-woven fibers, thermoplastic polymeric material, polyethylene terephthalate (PET), polycarbonate, polypropylene, semi-crystalline polyester resin, polybutylene terephthalate (PBT), thermosetting plastic, metal, ion-exchange resin, ceramic, activated carbon, and combinations thereof.

10. The device of claim 4, wherein the filter material is replaceable.

11. The device of claim 10, wherein the fluid treating unit includes a container having openings for allowing passage of a liquid therethrough, the container enclosing the filter material and being sized to be entirely disposed within the housing of the fluid reservoir assembly.

12. The device of claim 1 wherein each of the outlet portions, further includes a vent associated with the valve and is configured to be disposable into the container during the filling mode and to control the level of liquid filling the container.

13. A system for filling a plurality of individual containers, the system comprises:
   a plurality of individual containers for directly receiving a liquid therein, each of said containers forming a neck having an outer diameter; and
   a device for filling a plurality of the containers with a treated liquid, the device includes a fluid reservoir assembly for holding a liquid and including a floor; and
   a fluid treating unit arranged in fluid communication with the fluid reservoir assembly to treat a liquid, wherein the fluid reservoir assembly and the fluid treating unit allows passage of a liquid therethrough by gravity, and wherein the fluid reservoir assembly includes a plurality of outlets each one of which is for generally diverting a treated liquid into one of the individual containers, each of the outlets including an opening through the floor and a sleeve aligned with the opening and projecting from the floor, wherein an inner diameter of the sleeve is greater than the outer diameter of the neck such that a portion of the neck is received within the sleeve and wherein an inner diameter of the sleeve is substantially constant along the entire length of the sleeve.

14. The system of claim 13, wherein the fluid reservoir assembly is constructed to generally simultaneously divert a treated liquid into the plurality of outlets.

15. The system of claim 13 wherein each of said containers does not include a valve mechanism.

* * * * *